Sept. 22, 1931.                J. EGGERT ET AL                1,824,664
                                SOUND BOX MEMBRANE
                              Filed Sept. 13, 1929
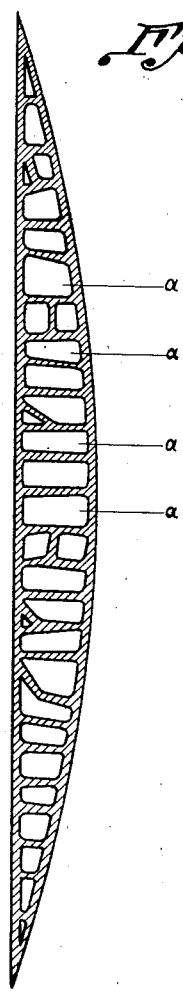
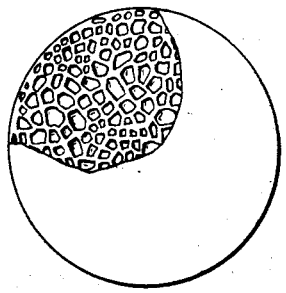
Inventors:
John Eggert
Richard Schmidt,
by Byrnes, Townsend + Brickenstein,
                                Attorneys.

Patented Sept. 22, 1931

1,824,664

UNITED STATES PATENT OFFICE

JOHN EGGERT, OF LEIPZIG, AND RICHARD SCHMIDT, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SOUND BOX MEMBRANE

Application filed September 13, 1929, Serial No. 392,434, and in Great Britain August 19, 1929.

Our present invention relates to a new membrane for sound boxes and more particularly to such a membrane consisting of a cellulose derivative.

It has been proposed to make membranes for sound boxes in the form of films produced from solutions of cellulose derivatives. Such membranes, however, have not displaced those made from sheets of mica since their tone reproduction does not fulfill the requirements. By this invention membranes of excellent tone reproduction are made from cellulose derivatives by giving the film a particular form. The membrane must consist of a circular film diminishing in thickness towards its periphery and must have a system of closely adjacent hollow chambers. Thus the membrane consists of a large number of hollow chambers lying side by side in the manner of a honeycomb, the partitions between which chambers are very thin. This structure produces a high resistance to bending and a high elasticity of the membrane, the latter having only a very small mass in spite of its comparatively large volume. The small mass of the new membrane, the weight of which is only half that of a mica membrane of the same size, is an essential advantage since there is required only very little power for moving the membrane and the inertia of a membrane is dependent, among other things, upon its mass.

Our new membrane is illustrated by the annexed drawings. Fig. 1 represents a cross-section of our new membrane in a plane perpendicular thereto on an enlarged scale, and Fig. 2 a front view thereof partially in section. In Fig. 1 the letter "$a$" marks the hollow chambers mentioned above.

The new membrane has about the same loudness of tone as the mica membrane has, but excels the latter in respect to compass and clearness of tone. The reproduction of tones emitted at high periods of oscillation are less shrill, and loud, polyphone; rapidly increasing sounds are reproduced considerably more clearly, since the subdivision of the membrane into numerous individual chambers strongly damps the oscillations and prevents the preponderance of certain frequencies.

Any cellulose derivative which is soluble in a mixture of solvents of the group comprising for instance alcohol-ether or alcohol-benzene may serve as the material from which the new membranes are to be made. Waste films may be used with advantage. In the manufacture of the membranes any process is suitable which permits the production of the system of closely adjacent hollow chambers, which is the characteristic of the membrane. The simplest process consists in dissolving the particular derivative used for making the membrane in a mixture of solvents, of which one component boils at a considerably lower temperature than the rest, the difference between the boiling points of the solvents being about 30° C. By evaporating the constituent of low boiling point of the solution, the hollow chambers are produced in the mass while it is still viscous, owing to the presence of the solvents of higher boiling point.

For example, there is caused to flow on to a glass plate from a stationary pipette 4 grams of a solution of 20 per cent strength of waste nitro-cellulose film in a mixture of 3 parts of ether and 1 part of ethanol. When drying begins at room temperature, the surface of the mass arches itself in the form of a section of a sphere. The now clock-glass form of the solidifying mass renders possible the production of the honeycomb formation of closely adjacent and approximately radially directed hollow chambers. The membrane may be dried completely at a raised temperature up to 80° C. There is obtained a membrane of 5.5 centimeters diameter whose thickness at the centre is 0.14 centimeter, and at the periphery 0.07 centimeter. The hollow chambers have an average surface of 0.16 square centimeter and are about 0.12 centimeter high. The weight of the membrane is about 0.8 gram.

The surface of the membranes adjacent to the casting base is always completely smooth and the free upper surface, generally, becomes smooth during drying. Even if hollow spaces near the surface should become ruptured during drying, so as to form a small cavity, the surface quickly becomes smooth owing to the plasticity of the material.

It is obvious that our invention is not limited to the foregoing example. Other cellulose derivatives which are soluble in a solvent mixture having a remarkable difference between the boiling points of its constituents may be used. Pigments or resins may be added to the dope to produce a greater stiffness of the membrane, on the other hand plastifying or softening agents may be used to compensate the brittleness of certain cellulose derivatives.

What we claim is:—

1. A sound box membrane consisting of a circular film of a cellulose derivative diminishing in thickness towards the periphery and including a plurality of closely adjacent hollow chambers the diameter of which is considerably greater than the thickness of their walls.

2. A sound box membrane consisting of a circular film with smooth surfaces of a cellulose derivative, said circular film diminishing in thickness towards the periphery and including a plurality of closely adjacent hollow chambers the diameter of which is considerably greater than the thickness of their walls.

3. A sound box membrane consisting of nitrocellulose and having the form of a circular film diminishing in thickness towards the periphery and including a plurality of closely adjacent hollow chambers the diameter of which is considerably greater than the thickness of their walls.

4. A sound box membrane consisting of nitrocellulose and having the form of a circular film with smooth surfaces diminishing in thickness towards the periphery and including a plurality of closely adjacent hollow chambers the diameter of which is considerably greater than the thickness of their walls.

5. A sound box membrane consisting of nitrocellulose and camphor and having the form of a circular film diminishing in thickness towards the periphery and including a plurality of closely adjacent hollow chambers the diameter of which is considerably greater than the thickness of their walls.

6. A sound box membrane consisting of nitrocellulose and camphor and having the form of a circular film with smooth surfaces diminishing in thickness towards the periphery and including a plurality of closely adjacent hollow chambers the diameter of which is considerably greater than the thickness of their walls.

7. A sound box membrane consisting of nitrocellulose and camphor having the form of a circular film of about 0.14 centimeter thickness at the center and of about 0.07 centimeter at the periphery, including a plurality of closely adjacent hollow chambers having an average surface of about 0.16 square centimeter and a height of about 0.12 centimeter.

8. The process of producing a cellulose derivative sound box membrane which comprises pouring from a stationary pipe a solution of a cellulose derivative dissolved in a solvent mixture the constituents of which show a boiling point difference of about 30° C. onto a plane surface, and drying the lenticular film formed.

In testimony whereof, we affix our signatures.

JOHN EGGERT.
RICHARD SCHMIDT.